United States Patent Office 3,184,467
Patented May 18, 1965

3,184,467
GRANATANOL-(3 BETA)-ESTERS
Otto Dold, Lampertheim, Hesse, Kurt Stach, Mannheim, and Wolfgang Schaumann, Mannheim-Waldhof, Germany, assignors to C. F. Boehringer & Soehne G.m.b.H., Mannheim-Waldhof, Germany
No Drawing. Filed Oct. 17, 1962, Ser. No. 231,264
4 Claims. (Cl. 260—294.3)

The present invention relates to a new class of organic compounds and more particularly to the granatanol-(3 beta)-esters of the following structural formula:

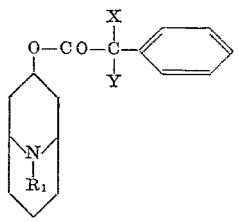

and the salts thereof wherein X is hydrogen or a hydroxyl group. Y is phenyl or a cycloalkyl radical, and $R_1$ is a lower alkyl, alkenyl, or aralkyl radical.

The novel granatanol-(3 beta)-esters of the invention possess pronounced anticholinergic properties and a low toxicity whereby the peripheral anticholinergic activity is substantially repressed in favor of a pronounced central anticholinergic activity.

The new esters are effective therapeutic agents for the treatment of disorders of the central nervous system. More specifically, these novel compounds have utility as tranquilizers, anticholinergics and anti-Parkinsonism drugs. In particular, they may be used as premedication by the anaesthesiologist. They may be used in the form of the free bases, but preferably are used as acid addition or quaternary ammonium salts.

The corresponding alpha-isomers are already known having been described in the Austrian patent, Serial No. 198,771. Between the known alpha-isomers and the beta-isomers of the invention, there exists a cis-trans isomerism in regard to the position of the nitrogen bridge and of the ester residue:

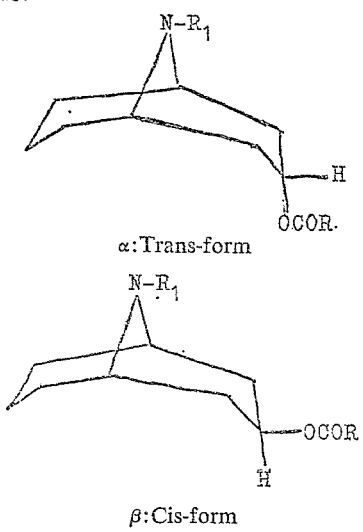

The compounds of the Austrian patent, generally, are described as having a strong local anaesthetic effect and additionally an anti-spasmodic and anti-histaminic action. However, the Austrain patent does not mention any pharmacological details about granatanol esters, specifically. It has been found by the inventors herein that some of a granatanol-(3 alpha)-esters have also anticholinergic properties.

The effect of anti-cholinergics on the central nervous system is utilized in the treatment of Parkinson's disease and in their application as tranquilizing agents, as for example is scopolamine for the induction of narcosis. The therapentic application of their central effect is often hampered by peripheral effects, such as, for example, dryness of the mouth and accommodation difficulties. The development of anti-cholinergics of high central effectiveness having as few peripheral effects as possible (i.e., high central specificity), is, therefore, of great importance. Surprisingly, the compounds of the invention, i.e., the granatanol-(3 beta)-esters exhibit markedly outstanding central anti-cholinergic properties in comparison with the known (three-alpha) compounds, and at the same time are possessed of a more favorable therapeutic index.

The granatanol-(3 beta)-esters may be prepared by reacting a granatanol-(3 beta) compound of the formula:

with a substituted phenylacetic acid of the formula:

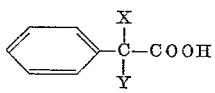

wherein R', X, and Y have the previously given meanings, or a functional derivative of a substituted phenylacetic acid. Examples of functional derivatives of acids suitable for use in accordance with the invention include the halides obtainable from the acid by halogenation thereof and the lower alkylesters, it being advantageous in the latter case to perform the reaction in the presence of a basic catalyst such as, for example, sodium of sodium methylate.

The granatanol-(3 beta) compounds used as starting materials are prepared by reducing the corresponding granatanone-(3)-compounds. However, it must be observed in this connection that either the granatanol-(3 alpha) compounds or their (3 beta) position isomers can be formed, according to the method of reduction that is used. Catalytic hydration with Raney nickel catalyst produces the 3 alpha-isomers (trans form) almost exclusively, while reduction with sodium in a primary alcohol produces mainly the 3 beta-(cis form) isomers. According to K. Alder et al. (Ann. 620, 73/1959), the reduction of granatanone-(3) compounds with lithium-aluminum hydride catalyst also produces the 3 beta-isomers (see also the LiAlH$_4$ reduction of tropinone according to Minza, Nature 170, 630 (1952) which produces 3 beta-isomers (pseudotropine) exclusively). It has been found, however, by the inventors herein that the reduction of granatanone-(3) compounds with lithium-aluminum hydride produces the 3 alpha-isomers

almost exclusively.

As noted above, the novel esters may be used in the form of the free bases, but preferably are used as acid addition or quaternary ammonium salts. The bases of the invention form salts with a variety of inorganic and strong organic acids including maleic, fumaric, benzoic, ascorbic, pamoic, succinic, bis-methylenesalicylic, methane sulfonic, acetic, propionic, tartaric, salicylic, citric, lactic, malic, mandelic, stearic, palmitic, glutamic, and hydrochloric, hydrobromic, sulfuric, sulfonic, phosphoric, and nitric acids. Such salts are easily prepared by the methods known to the art. The bases react with either the calculated amount of organic or inorganic acid in aqueous miscible solvents, such as acetone, or ethanol with isolation of the salt by concentration and cooling or an excess of the acid in aqueous immiscible solvent, such as ethylether or chloroform, with the desired salt separating directly. Of course, the salts may also be prepared by the classical method of double decomposition of appropriate salts which is well known to the art. The esters of the foregoing type also form quaternary ammonium salts with a variety of organic esters. Among such esters are methylchloride and bromide, ethylchloride, propylchloride, butylchloride, isobutylchloride, benzylchloride, and bromide, ethylbromide, naphthylmethylchloride, dimethylsulfate, diethylsulfate, methylbenzenesulfate, ethyltoluenesulfate, and ethylenechlorohydrin. The alkylhalide quaternary salts are suitably prepared by treating the base in an anhydrous solvent medium with an excess of the alkylhalide and recrystallizing the product from the ethanol.

A prepared salt which is non-toxic at the therapeutic dosage level and non-hygroscopic is the hydrohalide and preferably the hydrochloride.

The invention is described in further detail in the following illustrative examples without, however, intending to thereby in any way restrict the scope thereof. The temperatures are in degrees centigrade.

EXAMPLE 1

*Granatanol-(3-beta)-diphenylacetate*

(a) Granatanol-(3-beta) is prepared according to K. Alder and H. A. Dortmann, Ber. 86, 1544 (1953), by the reduction of granatanone-(3), i.e., pseudo-pelletierine, with sodium in alcohol.

(b) 15.5 g. granatanol-(3-beta) and 25.3 g. diphenylacetic acid chloride are heated in 100 ml. pyridine for 8 hours under reflux. The reaction mixture is then dissolved in water, made alkaline with dilute ammonia and extracted with ether. The ether extract solution is dried and concentrated whereby the desired ester precipitates out in crystalline form. It is recovered by vacuum filtration. 28.5 g. of granantanol-(3-beta)-diphenylacetate having a melting point of 79–81° (after recrystallization from petroleum ether) are obtained. The yield amounts to 81.5%.

Treatment of a solution of granatanol-(3 beta)-diphenylacetate in ether with ethereal hydrochloric acid results in the formation of the hydrochloride, the same having a melting point of 224–226° C. (recrystallized from isopropanol).

EXAMPLE 2

*Granatanol-(3 beta)-benzilic acid ester*

46.6 g. granatanol-(3 beta), 76 g. benzilic acid methylester and 0.5 g. sodium are heated at a pressure of 30 mm. and a temperature of 90° C. for three hours, followed by heating for 7 hours at 130° C. Any unreacted sodium still present is removed from the resulting melt. After cooling, 200 ml. 2 N hydrochloric acid are added and the mixture heated to boiling for a short time. The mixture is cooled and 250 ml. ether are then added with agitation. The grease-like residue thereby becomes crystalline. On suction filtration, 65.5 grams of granatanol-(3 beta)-benzilic acid ester hydrochloride are obtained (53.3% yield). After two recrystallizations from isopropanol, the granatanol-(3 beta)-benzilic acid ester hydrochloride melts with decomposition at 227° C.

EXAMPLE 3

*N-benzylnorgranatanol-(3-beta)-benzilic acid ester*

(a) 200 g. 25% glutaric dialdehyde solution is mixed with a solution of 73 g. acetonedicarbonic acid, 53.6 g. benzylamine and 28.2 g. sodium acetate trihydrate in 1250 ml. water. The pH of the resulting solution is adjusted to a pH of 3 by the addition of concentrated hydrochloric acid and permitted to remain at room temperature for 3 days. The mixture is then made alkaline with soda lye and extracted repeatedly with chloroform. The extract is dried and concentrated and the residue is distilled. 70.2 grams (yield of 61.2%) of N-benzyl-norpseudopelletierine are obtained having a boiling point$_{0.2}$ of 165–169° C.

N-benzyl-norpseudopelletierine hardens and melts after recrystallization from petroleum ether. The melting point of the hydrochloride is 228° C. with decomposition (after recrystallization from isopropanol).

(b) 45.8 g. (0.2 mol) N-benzyl-norpseudopelletierine are dissolved in 200 ml. amyl alcohol and 45 grams of sodium are added thereto in small pieces over a period of 5 hours at a boiling temperature. The resulting solution is then heated under reflux for another hour. 700 ml. water are added and the resulting mixture is thoroughly extracted with ether several times. The ether extract is dried and concentrated and the residue is distilled. In this manner, 40.4 grams of N-benzyl-norgranatanol-(3 beta) are obtained having a boiling point $_{0.4}$ of 168–194° C. The yield amounts to 87.6%. The melting point of the hydrochloride is 237–239° C. (after recrystallization from alcohol).

(c) 23.1 grams N-benzylnorgranatanol-(3-beta) and 26.5 grams of alpha-chlordiphenylacetylchloride (prepared from benzilic acid and phosphorus pentachloride according to J. H. Billmann and P. H. Hidy, Am. Soc., 65, 760 (1943)) are dissolved in 220 ml. of methylene chloride and heated under reflux for 2 hours. The solvent is then distilled off, the residue dissolved in 2 liters of hot water, and the resulting solution is heated at boiling for an additional 8 hours, approximately 2 grams of N-benzyl-norgranatanol-(3-beta)-benzilic acid ester in the form of the hydrochloride are precipitated (yield =41.8%). Additional amounts of the N-benzylnorgranatanol-(3-beta)-benzilic acid ester are obtained by concentrating the mother liquors. After recrystallization from isopropanol, the melting point amounts to 218–220° C. The base freed by treatment of an aqueous solution of the hydrochloride with soda lye melts after recrystallization from petroleum ether at 101–102° C.

EXPERIMENTAL DATA

The peripheral anti-cholinergic effectiveness of the granatanol-(3-beta)-esters in accordance with the invention was determined on the basis of the mydriasis of the mouse (P. Pulewka, Arch. Exp. Path. u. Pharmacol. 168, 307/1932) and by means of the chromodacryorrhea test (A. Burgen, Brit. J. Pharmacol. 4, 85 (1947)) on the rat.

The evaluation of central anticholinergic effectiveness was on the basis of the following three test methods:

(a) *Tremorin tremor test*

"Tremorin" (1,4-dipyrrolidino-2-butine) produces a tremor which to some extent parallels the symptoms of Parkinson's disease, and which is abolished like the latter by the action of anticholinergics on the central nervous system. Accordingly, the inhibition of the "Tremorin tremor" in the mouse can be taken as an indication of a central anticholinergic effect (cf. G. M. Everett, Nature (London) 177, 1928/1956).

(b) *Mintacol toxicity test*

The peripheral effectiveness of "Mintacol" (diethylphosphoric acid-p-nitrophenolester, Paraoxon), a cholinesterase inhibitor, is hampered by PAM (pyridine-2-aldoxime-1-methyliodide). Death caused by Mintacol after previous treatment with PAM is accordingly due to a central cholinergic effect and can be avoided by administration of centrally effective anticholinergices (cf. W. Schaumann, Arch. Exp. Path. u. Pharmacol. 239, 96/1960).

The animals (mice) received an absolutely lethal dose of Mintacol with a simultaneous dose of PAM. The substances to be tested were administered subcutaneously 15 minutes prior to the administration of the Mintacol and PAM, and the dose which serves to reduce the central toxicity of Mintacol to 50% was taken as the $ED_{50}$.

(c) *Inhibition of catatonia induced by Dartal*

Dartal (2-chlor - 10 - [gamma-{4-beta-acetoxyethyl)-piperazinyl} - propyl] - phenothiazine (Thiopropazate) causes a "flexibilitas cerea" (catatonia) in the rat which can be eliminated by centrally active anti-cholinergic agents (cf. W. Schaumann and H. G. Kurbjuweit, "Arzneimittel-Forschung," 11, 343/1961 and M. Taschler et al., "Psychiatria et Neurologia," 139, 85/1960). The experimental animals (rats) first received Dartal, and the dose of the test subtance which prevents the occurrence of catatonia in half of the animals was determined.

An index of central specificity can be determined from the absolute values of the peripheral and central anticholinergic activity as determined by the experiments, i.e., by dividing the $ED_{50}$ calculated on the basis of the mouse mydriasis test by the $ED_{50}$ from the Tremorin test and Mintacol test (mouse), respectively, and multiplying the quotient by 100. In like manner, the quotient of the $ED_{50}$ derived from the chromodacryorrhea test divided by the $ED_{50}$ as arrived at from the Dartal test was determined.

The following compounds were utilized in the tests:
A. Granatanol-(3-alpha)-benzilic acid ester [Austrian Patent No. 198,771, Example 14].
B. Granatanol-(3-beta)-benzilic acid ester [Example 1 of the present application].
C. N-benzylnorgranatanol-(3-alpha)-benzilic acid ester [Austrian Pat. No. 198,771, Example 23].
D. N-benzylnorgranatanol-(3-beta)-benzilic acid ester [Example 3 of the present application].

From the results of the comparative tests as compiled in the table set forth below, it is apparent that there are significant differences in the pharmacological effects (therapeutic action) of the granatanol-(3) alpha and beta (isomers) esters. For example the compound D is possessed of particularly pronounced central anticholinergic activity in accordance with the invention while the alpha isomer of the Austrian patent (Compound C) has practically no anticholinergic effect (either peripherally or centrally).

In a similar manner the Compound B in accordance with the invention is distinguished from the alpha isomer (Compound A) by an elevated central anticholinergic specificity and a more favorable therapeutic index.

TABLE

| | Peripheral activity | | |
|---|---|---|---|
| | Toxicity, LD–50, mg./kg. subcut. mouse | Mydriasis, mg./kg., subcut. mouse | Chronodacr., mg./kg., subcut. rat |
| A | 110 | 0.35 | 0.09 |
| B | 70 | 0.20 | 0.07 |
| C | (¹) | ∅ | ∅ |
| D | ² 330 | 3.80 | 160 |

| | Central activity | | | | | |
|---|---|---|---|---|---|---|
| | Mintacol toxicity, mg./kg. subcut. mouse | Ther. index | Tremorin tremor, mg./kg. subcut. mouse | Ther. index | Dartal, mg./kg. subcut. rat | Ther. index |
| A | 0.23 | 478 | 0.87 | 126 | 0.35 | 314 |
| B | 0.04 | 1,750 | 0.09 | 778 | 0.24 | 290 |
| C | ∅ | | ∅ | | (¹) | |
| D | 1.10 | | 2.60 | | 20.0 | |

| | Central specificity | | |
|---|---|---|---|
| | ED–50 mydr.×100 / ED–50 Mintacol | ED–50 mydr.×100 / ED–50 Tremorin | ED–50 chromdacr.×100 / ED–50 Dartal |
| A | 152 | 40 | 26 |
| B | 500 | 222 | 29 |
| C | | | |
| D | 345 | 146 | 800 |

¹ The LD–50 and Dartal catatonia tests were not performed, since the substance proved to be practically ineffective in all other experiments.
² Due to poor solubility in water, the LD–50 had to be determined on the basis of oral administration.

We claim:
1. A granatanol-(3β)-ester of the class consisting of the free base of the formula:

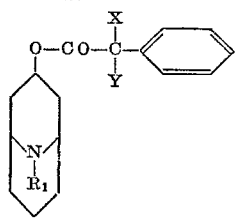

and its hydrochloride, wherein X is a member selected from the group consisting of hydrogen and hydroxyl, Y is phenyl and R₁ is a member selected from the group consisting of methyl and benzyl.
2. Granatanol-(3β)-diphenylacetate.
3. Granatanol-(3β)-benzilic acid ester.
4. N-benzylnorgranatanol-(3β)-benzilic acid ester.

References Cited by the Examiner
FOREIGN PATENTS
198,771    7/58    Australia.

OTHER REFERENCES
Zirkle et al.: J. Org. Chem., vol. 26, pages 395–407, (1961).

IRVING MARCUS, *Primary Examiner.*
NICHOLAS S. RIZZO, *Examiner.*